United States Patent [19]
Bergin

[11] Patent Number: 5,940,409
[45] Date of Patent: Aug. 17, 1999

[54] PROTOCOL ANALYSIS METHOD AND SYSTEM

[75] Inventor: Brent Bergin, Highland Village, Tex.

[73] Assignee: MCI Communications Corporation, Washington, D.C.

[21] Appl. No.: 08/870,568

[22] Filed: Jun. 6, 1997

[51] Int. Cl.[6] .................................................. H04J 3/12
[52] U.S. Cl. .......................................... 370/523; 370/522
[58] Field of Search .................................... 370/522, 523, 370/524, 496, 525, 526, 527, 528

[56] References Cited

U.S. PATENT DOCUMENTS

| | | | |
|---|---|---|---|
| 4,730,312 | 3/1988 | Johnson et al. | 370/523 |
| 5,093,830 | 3/1992 | Munter | 370/523 |
| 5,408,524 | 4/1995 | Reum | 379/157 |
| 5,457,690 | 10/1995 | Joffe et al. | 370/523 |
| 5,602,828 | 2/1997 | Engdahl et al. | 370/228 |

*Primary Examiner*—Ajit Patel

[57] ABSTRACT

A method of and system for monitoring the conditions of channels in a multichannel telecommunications line, wherein each of the traffic channels uses A/B bit signaling to signal their condition. Whenever the system detects a setup acknowledgment message in a command channel that includes a call reference and a channel identifier, the system displays the detected setup acknowledgment message and monitors the channel identified by said channel identifier for a change in line status, as indicated by a change in its A/B bits. In response to detection of a change in the A/B bits of the channel identified by the channel identifier, the system decodes the A/B bits and displays the changed line status.

32 Claims, 8 Drawing Sheets

FIG. 8

PROTOCOL ANALYSIS METHOD AND SYSTEM

FIELD OF THE INVENTION

The present invention relates generally to protocol analyzers and more particularly to a protocol analyzer for use in a multichannel synchronous telecommunications protocol, such as TR303, in which command signaling is carried in a command channel and supervision signaling is carried by A/B bit signaling in the traffic channels.

DESCRIPTION OF THE PRIOR ART

In certain systems for providing local telephone service, analog telephones are connected to a digital central office through a remote station. The remote station includes a line card for each analog subscriber line, and equipment for performing analog/digital conversion on signals on the analog subscriber line and multiplexing the digitized signals on to T1 lines connected to the digital central office. The remote digitizes the analog signal into a single 64 Kbps DS0 channel. A T1 line can carry one DS1 channel, which comprises twenty-four DS0 channels.

The signaling on the T1 connecting the remote to the central offices defined in TR303. Channel twenty-four is a command channel that uses a protocol specified in Q.921 and Q.931. Channel twelve is a provisioning channel. The remaining twenty-two DS0 channels on the T1 are devoted to traffic. The signaling on the command channel is devoted primarily to call setup and release. The signaling on the command channel does not include any information on the status of the lines associated with each DS0 traffic channel. Rather, line status information is communicated on the traffic channels themselves by means of robbed bit signaling in supervisory frames. More specifically, in every sixth frame, the two least significant bits, which are referred to as A/B bits, of the octet of each channel convey information with respect to the status of the line associated with the channel. A/B bits of 11 indicate that the line is on-hook or idle, A/B bits of 00 indicate that the line is off-hook or active, and A/B bits 01 indicate that the line is ringing.

Protocol analyzers are useful in troubleshooting systems. A protocol analyzer monitors a line and translates and displays the data stream on the line in human readable form. In conventional protocol analyzers, the protocol analyzer monitors only the command channel of the first T1. The protocol analyzer decodes the messages on the command channel and displays those messages on a screen. The setup and setup acknowledgment messages identify the DS1 and DS0 selected for a particular call, which is identified by a call reference. However, conventional analyzers do not report the A/B bit signaling along with the TR303 signaling. Equipment is available to decode and display the status of the A/B bits; however, there is no system available that displays both A/B bit signaling and TR303 signaling concurrently.

SUMMARY OF THE INVENTION

The present invention provides a method of and system for monitoring the conditions of channels in a multichannel telecommunications line. The channels include a command channel and a plurality of traffic channels, wherein each of the traffic channels uses A/B bit signaling to signal their condition. Briefly, the system of the present invention monitors the command channel. Whenever the system detects a setup acknowledgment message that includes a call reference and a channel identifier, the system displays the detected setup acknowledgment message and monitors the channel identified by said channel identifier for a change in line status, as indicated by a change in its A/B bits. In response to detection of a change in line status of the channel identified by the channel identifier, the system displays the changed line status.

Whenever the A/B bits signal a transition from an off-hook condition to an on-hook condition, the system starts a timer. If the timer times out without the detection of a transition of the A/B bits from the on-hook condition to the off-hook condition, the system displays a call abandoned message. If the system detects a transition of the A/B bits from the on-hook condition to the off-hook condition before the timer times out and within a selected first range of time values, the system displays a hit message. If the system detects a transition of the A/B bits from the on-hook condition to the off-hook condition before the timer times out and within a selected second range of time values, the system displays a flash message. Finally, if the system detects a transition of the A/B bits from the on-hook condition to the off-hook condition before the timer times out and within a selected third range of time values, the system collects pulse dialed digits and displays a dialed digits message.

Preferably, the system maintains a table that includes a line for each traffic channel. Each line of the table includes an activity parameter, a call reference number, $A/B_{old}$ bit values, $A/B_{new}$ bit values, a timer parameter, a timer counter, an abandoned parameter, a digit receipt parameter, a digit counter, and a watch counter.

In response to detecting a setup confirm message identifying a channel and including a call reference, the system sets the activity parameter to active in the line for the identified channel. The system also inserts the call reference in the call reference number, and sets each of said $A/B_{old}$ and $A/B_{new}$ bit values in the line to "11." The system sets the timer parameter to off, and sets the timer counter to zero. The system sets the abandoned parameter and the digit receipt parameter to off and sets the digit counter and the watch counter to zero. In response to detecting a clear confirm message identifying a channel, the system sets the activity parameter in the line for the identified channel to off.

The system monitors a channel by replacing the $A/B_{old}$ bits with the $A/B_{new}$ bits, inserting the A/B bits of the channel into the $A/B_{new}$ value, and comparing the $A/B_{old}$ bits with the $A/B_{new}$ bits. Whenever the $A/B_{old}$ bits and the $A/B_{new}$ bits are different from each other, the system makes a report, based on the transition. The system sets the timer parameter to on whenever the comparison of the $A/B_{old}$ bits and the $A/B_{new}$ bits indicates a transition to on-hook. The system periodically increments the timer counter in each line having an activity parameter set to on, a timer parameter set to on, and an abandoned parameter set to off. If the count in the counter reaches a predetermined maximum value without the system detecting a transition from on-hook to off-hook, the system reports the call abandoned and sets the abandoned parameter to on.

Whenever the comparison of the $A/B_{old}$ bits and the $A/B_{new}$ bits indicates a transition to off-hook, the system sets the timer parameter to off and checks the count in the timer counter. Whenever the count is zero, the system reports off-hook. Whenever the count is in a range that indicates pulse dialed digits, the system sets the digit receipt parameter to on, increments the digit counter, and sets the watch counter to a selected value. The system periodically decrements the watch counter. When the watch counter is decremented to zero, the system reports the value in the digit counter and sets the digit receipt parameter to off.

BRIEF DESCRIPTION OF THE DRAWINGS

FIG. 8 is a diagram of the status table of the present invention.

DESCRIPTION OF THE PREFERRED EMBODIMENT

Figure 1:
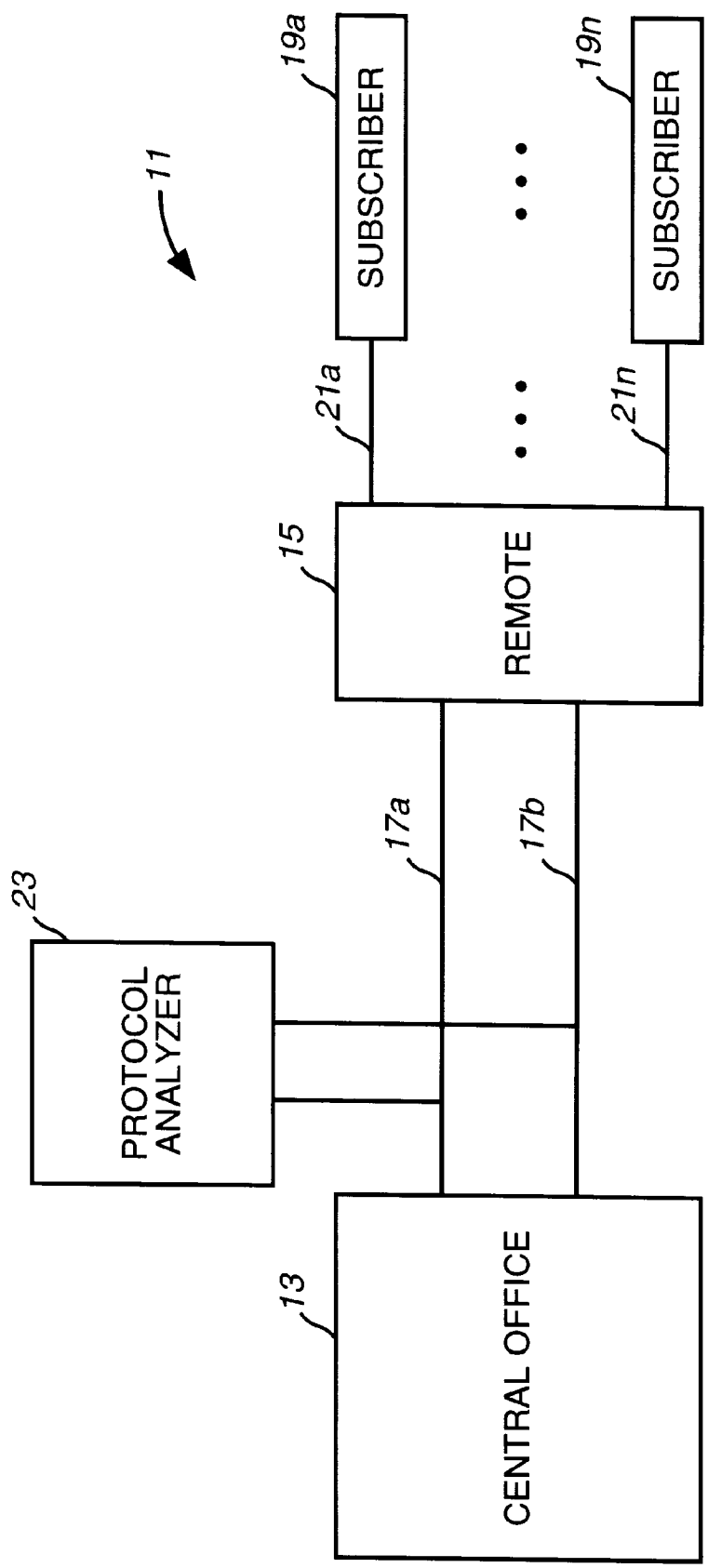
FIG. 1 is a block diagram of a system according to the present invention.

Referring now to the drawings, and first to FIG. 1, a portion of a local telephone system is designated generally by the numeral 11. Local telephone system 11 includes a central office 13 and a plurality of remotes, of which one remote 15 is shown. Remote 15 is connected to central office 13 by a plurality of T1 lines, including lines 17a and 17b. Remote 15 is connected to a plurality of subscriber telephone sets 19a–19n by means of a plurality of analog telephone lines 21a–21n.

Communication between subscribers 19 and remote 15 is analog and communication between remote 15 and central office 13 is digital. Thus, remote 15 performs analog to digital conversion and multiplexing services. In the preferred embodiment, each T1 17 carries a 1.544 Mbps DS1 channel that carries twenty-four 64 Kbps DS0 channels. Calls to and from each subscriber 19 are carried on a DS0 channel that is assigned to a particular call reference during call setup.

One of the DS0 channels carried by one of T1's 17 is a command channel. The command channel carries signaling according to Q.921 and Q.931 protocol that controls the setup and release of calls. The condition of analog lines 21 is signaled in system 11 by means of robbed bit signaling in the DS0 traffic channel assigned to the call.

The present invention provides a protocol analyzer 23. Protocol analyzer 23 is in the nature of a special purpose personal computer. It includes a display, a keyboard, a central processing unit, and memory. Protocol analyzer 23 includes a hardware interface through which it is connected to T1s 17a and 17b. As will be explained in detail hereinafter, protocol analyzer 23 includes software that is adapted to decode and process both the TR303 signaling and the A/B bit signaling.

Figure 2:
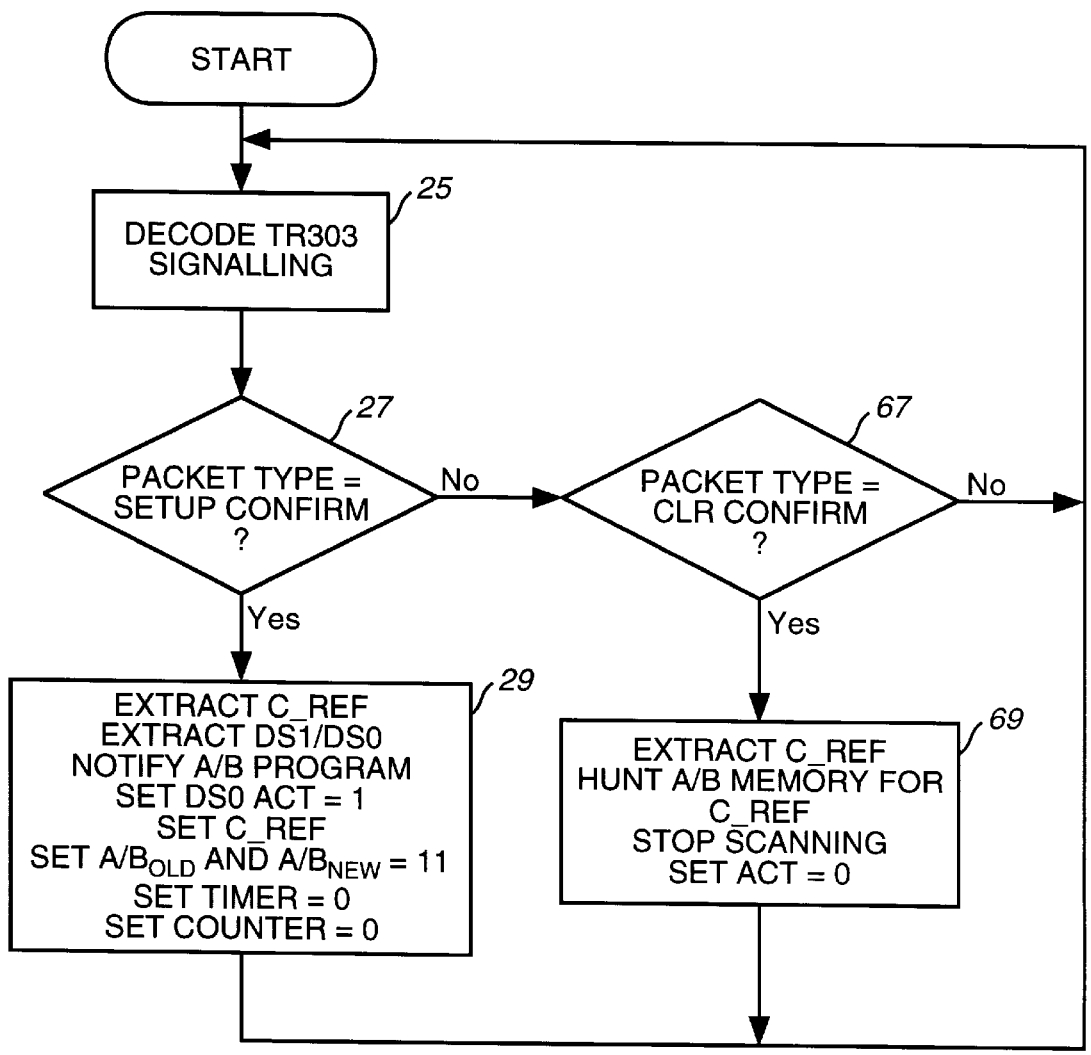
FIG. 2 is a flowchart of TR303 decoding according to the present invention.

Referring now to FIG. 2, there is shown a flow chart of the process according to the present invention. The system decodes the TR303 signaling generally at block 25. The system tests, at decision block 27, whether or not a detected packet type is a setup confirm message. If so, the system extracts the call reference and the DS1 and DS0 channel assigned to the call at decision block 29. In the preferred embodiment, A/B bit processing is performed by a separate process, which in block 29 is referred to as A/B program. The system notifies the A/B program of the detection of a call reference on a particular DS1 and DS0 channel.

Figure 8:
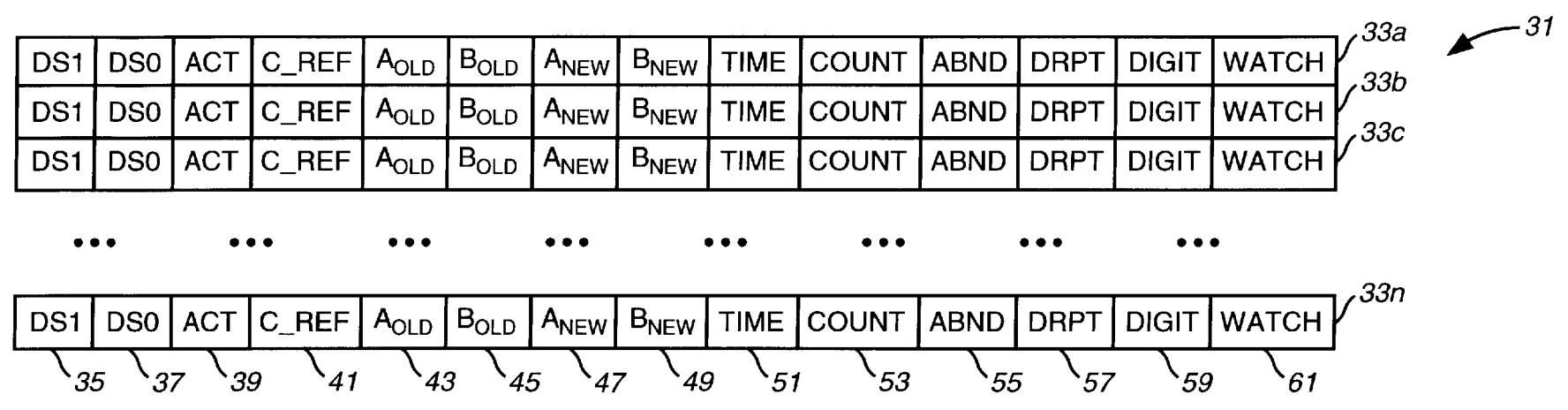

Referring to FIG. 8, the A/B program of the present invention uses a table, designated generally by the numeral 31, stored in memory of protocol analyzer 23. Table 31 includes a line 33 for each DS1 and DS0 channel. Each line 33 includes a plurality of fields including a DS1 field 35 and a DS0 field 37, which identify a channel. An activity field 39 contains a one bit activity parameter that indicates whether or not the DS0 channel is active. Each line 33 also includes a call reference field 41 that identifies the call assigned to the DS0 channel.

As will be described in detail hereinafter, each line 33 tracks the A/B status of its associated DS0 channel. Line 33 includes an $A_{old}$ field 43, a $B_{old}$ field 45, and $A_{new}$ field 47, and a $B_{new}$ field 49. Each of fields 43–49 contain a single bit.

Each line 33 also includes a number of fields that are used in decoding A/B bit transitions. A time field 51 contains a one bit time parameter that indicates whether or not a timer is active. A counter field 53 contains a timer count. An abandoned field 55 contains a one bit abandoned parameter that indicates whether or not a call has been abandoned. A digit reception field 57 contains a one bit parameter that indicates whether or not a pulse dialed digit reception is in process. A digit counter field 59 contains a count of pulse dialed digits received. Finally, a watch counter field 61 is used in connection with decoding pulse dialed digits.

Returning to FIG. 2, at block 29, the system inserts appropriate values into the line 33 of table 31 corresponding to the DS0 channel. More specifically, the system sets the activity parameter to one, which indicates that the channel is active, and inserts the call reference into the table. The system sets the A/B old and A/B$_{new}$ values to 11, which is the A/B coding for idle or on-hook, and sets each of the timer parameter, the counter, the abandoned parameter, the digit receipt parameter, the digit counter, and the watch counter to zero. Then, the system sends a setup confirm on the call reference for display on protocol analyzer 23 and returns to block 25.

If, at decision block 27, the packet type is not setup confirm, then the system tests at decision block 67 whether or not the packet type is clear confirm. If so, the system extracts the call reference from the packet and sets the activity parameter in table 31 for that call reference to zero, at block 69. Then, the system sends a clear confirm on the call reference for display on protocol analyzer 23 and returns to block 25. If, at decision block 67, the packet type is not clear confirm, then the system performs other processing.

Figure 3A:
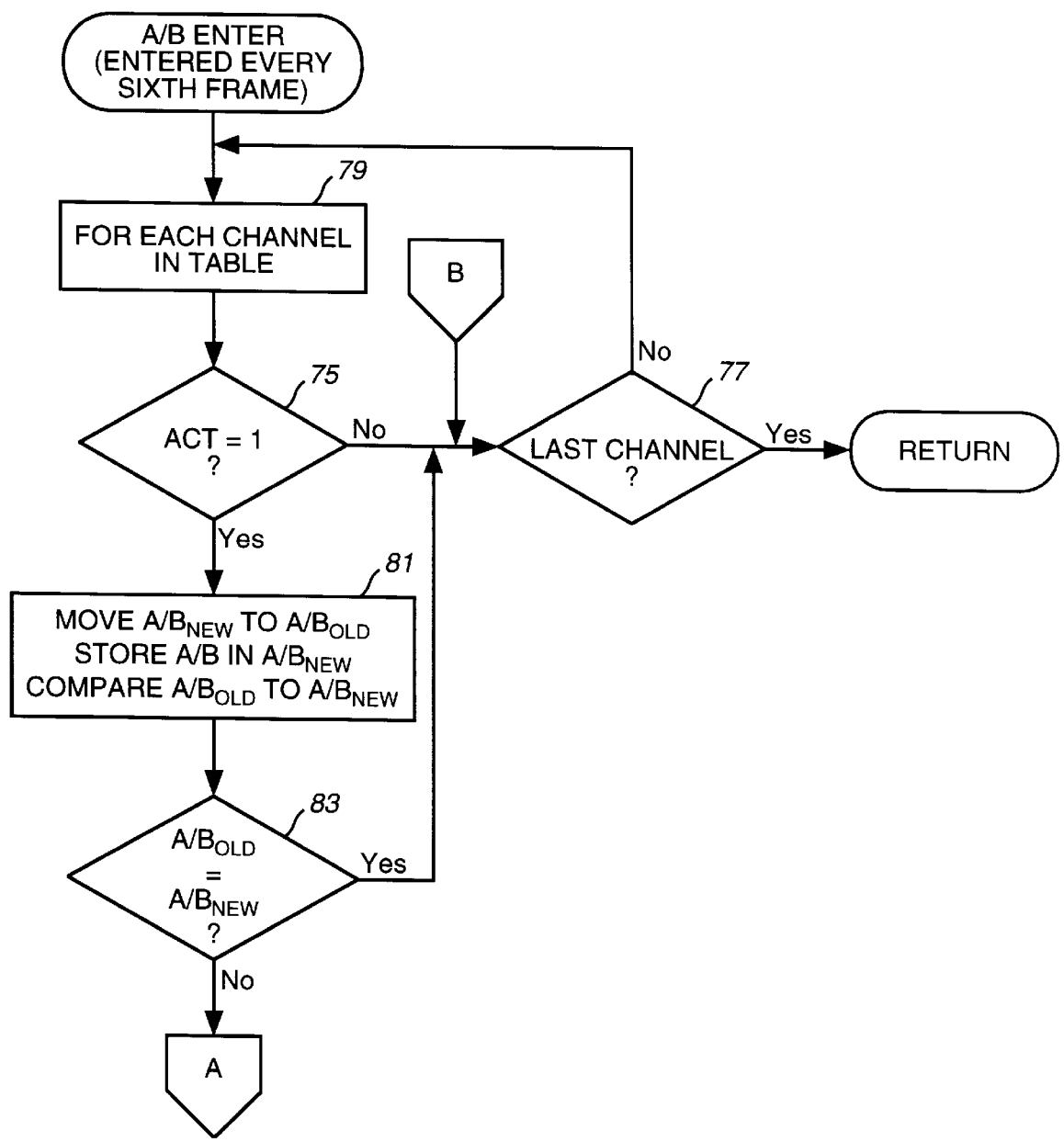
FIGS. 3A and 3B comprise a flowchart of A/B bit processing according to the present invention.

Referring now to FIG. 3A, there is shown a flow chart of A/B bit processing according to the present invention. The system buffers the supervision frames of each DS1 channel being monitored. The system tests, at decision block 75, for each channel in table 31, whether or not the activity parameter is set to one. If not, the system tests, at decision block 77, whether or not it has reached the last channel in table 31. If not, the system goes to the next table entry, at block 79. If, at decision block 77, the last channel has been checked, the system returns. The system enters A/B processing every sixth frame on each DS1.

If, at decision block 75, the activity parameter is set to one, then, at block 81, the system moves A/B$_{new}$ to A/B$_{old}$, stores the current A/B bit value, taken from the frame buffer, for the channel in A/B$_{new}$, and compares A/B$_{old}$ to A/B$_{new}$. Then, at decision block 83, the system tests A/B$_{old}$ equals A/B$_{new}$. If so, which indicates no change in the A/B bits, the system returns to decision block 77. If, at decision block 83, the A/B bits are different, then processing continues in FIG. 3B.

Figure 3B:
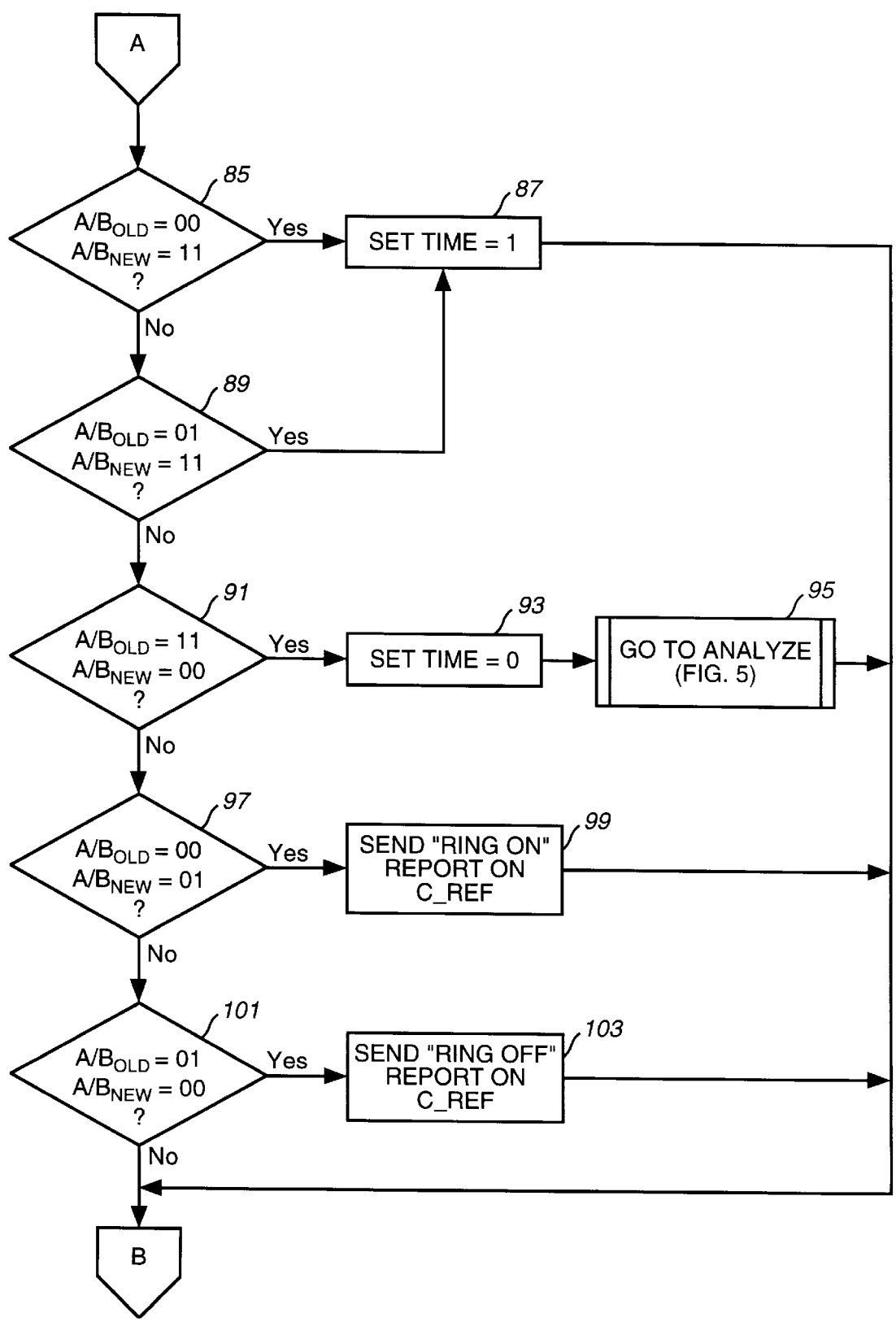

Referring to FIG. 3B, the system tests, at decision block 85, whether or not the A/B transition is from 00 to 11, which indicates a transition from off-hook to on-hook. If so, the system sets the time parameter (field 51 of line 33 of FIG. 8) to one, at block 87 and returns to decision block 77 of FIG. 3A. If the transition is not from off-hook to on-hook, at decision block 85, the system tests, at decision block 89, whether or not the A/B bit transition is from 01 to 11, which indicates a transition from ringing to on-hook. If so, the system again sets the time parameter to one at block 87.

If, at decision block 89, the A/B bit transition is not 01 to 11, then the system tests, at decision block 91, whether or not the A/B bit transition is from 11 to 00, which indicates a transition from on-hook or idle to off-hook. If so, the system sets the time parameter to zero, at block 93, and processing continues according to FIG. 5, as indicated generally at block 95. If, at decision block 91, the transition is not from on-hook to off-hook, the system tests, at decision block 97, whether or not the A/B bit transition is from 00 to 01. If so, the system sends a ring-on report on the call reference for display, at block 99 and returns to decision block 77 of FIG. 3A. If not, then the system tests at decision block 101 whether or not the A/B bit transition is from 01 to 00. If so, the system sends a ring-off report on the call reference for display, at block 103, and returns.

Figure 4:
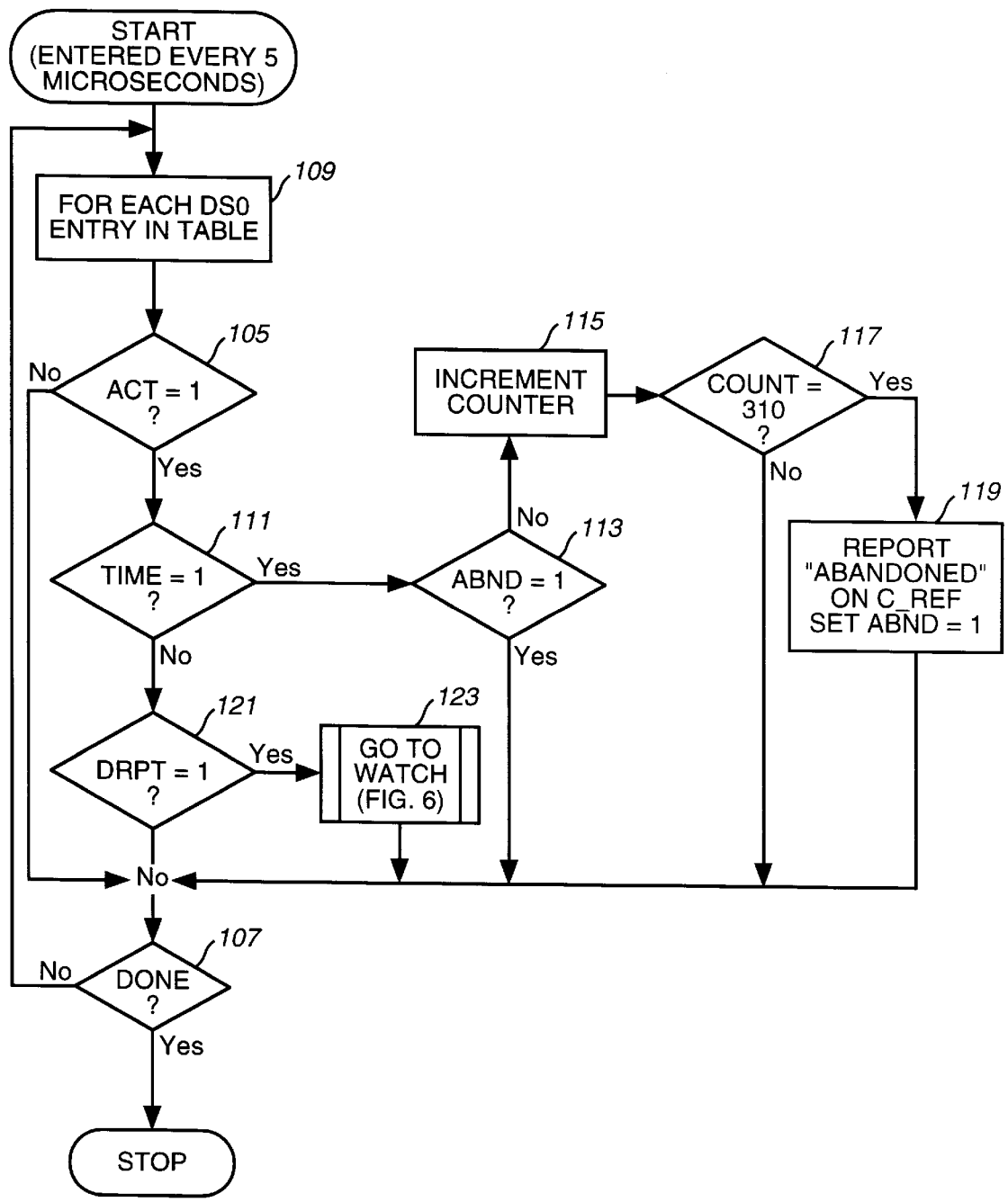
FIG. 4 is a flowchart of the timer process of the present invention.

In the preferred embodiment of the present invention, a separately running timer process maintains certain values in table 31. The timer process is entered every 5 milliseconds. Referring to FIG. 4, for each DS0 entry in the table, the system tests at decision block 105 whether or not the activity parameter is set to one. If not, processing continues at decision block 107 where the system tests whether or not all of the DS0 entries have been tested. If not, processing continues at block 109 to the next DS0 entry in the table.

If, at decision block 105, the activity parameter is set to one, then the system tests, at decision block 111, whether or not the time parameter is set to one. It will be recalled, with reference to block 29 of FIG. 2, that the timer parameter is initially set to zero. It will be recalled also, with reference to block 87 of FIG. 3B, that the timer parameter is set to one whenever there is an A/B bit transition that indicates that the line has gone on-hook. Referring still to FIG. 3B, it will further be recalled that the timer is reset to zero, at block 93, whenever there is a transition from on-hook to off-hook.

Referring again to FIG. 4, if, at decision block 111, the timer parameter is set to one, then the system tests, at decision block 113, whether or not the abandoned parameter is set to one. If not, the system increments the counter in table 31 at block 115. Then, the system tests at decision block 117 whether or not the count equals 310. Since the process of FIG. 4 is entered every 5 milliseconds, a count of 310 represents a time of 1.55 seconds. According to the present invention, if a line associated with a DS0 channel goes on-hook for 1.55 seconds, the line is considered abandoned. Accordingly, if at decision block 117, the count equals 310, the system reports abandoned on the call reference and sets the abandoned parameter to one, at block 119. If, at decision 117, the count is not equal to 310, then the system tests at decision block 107 whether or not all DS0 entries have been tested.

Referring again to decision block 111, if the timer parameter is not equal to one, then the system tests at decision block 121 whether or not the digit receipt parameter (field 57 of FIG. 8) is set to one. If so, processing continues at FIG. 6, as indicated generally at block 123. If the digit receipt parameter is not set to one, then the system tests, at decision block 107, whether or not all DS0 entries have been tested.

Figure 5:
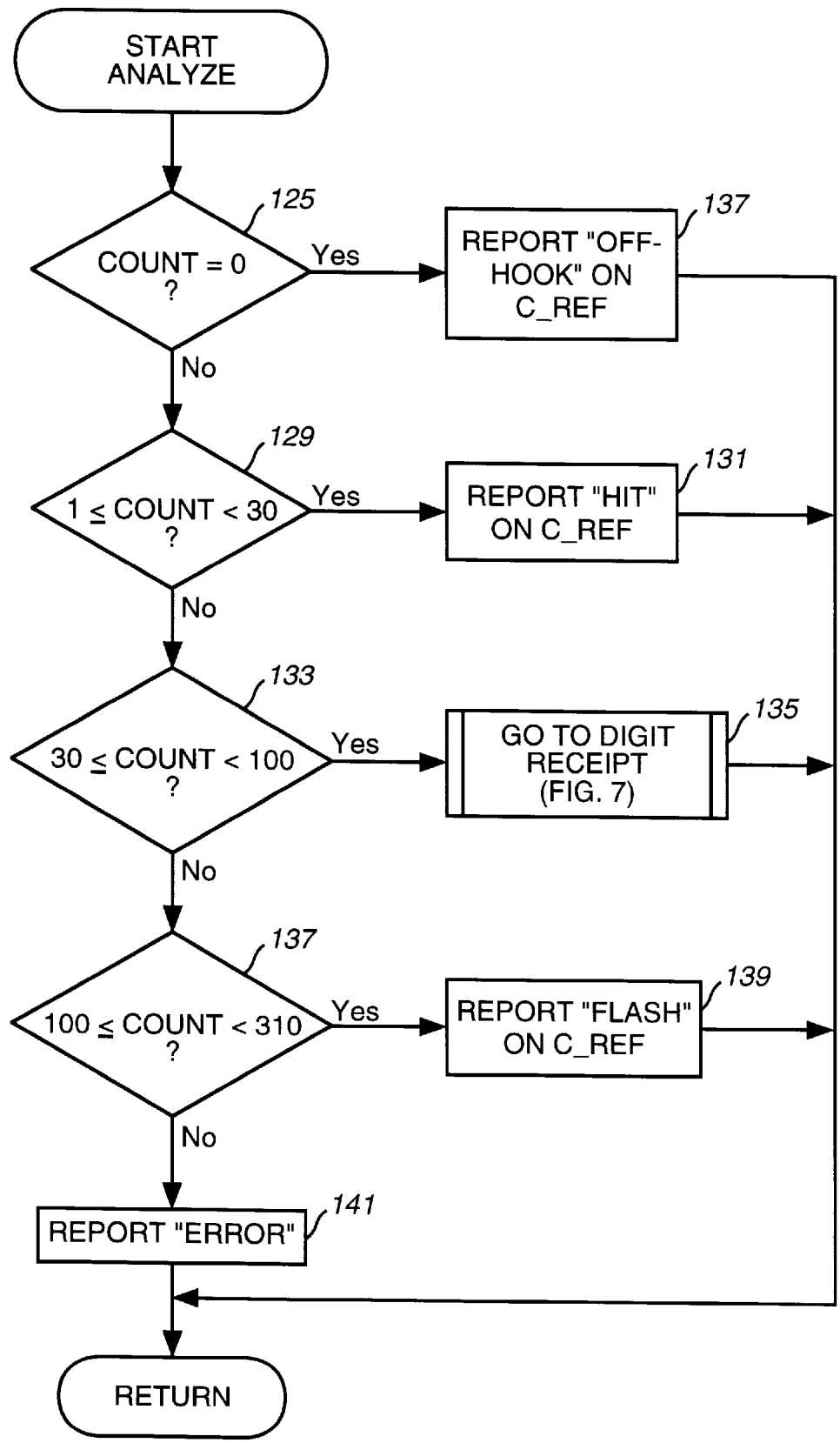
FIG. 5 is a flowchart of analysis processing according to the present invention.

Referring now to FIG. 5, there is shown the analysis process, which is indicated generally at block 95 of FIG. 3B. The analysis process is a part of FIG. 3B processing and it is entered whenever there is a transition from on-hook to off-hook for a DS0 channel. First, the system tests at decision block 125, whether or not the count for the DS0 channel is equal to zero. If so, the system reports off-hook on the call reference, at block 127 and returns. If the count is not equal to zero, then the system tests if the count is between one and twenty-nine, at decision block 129. A count of from one to twenty-nine indicates that the line was on-hook for a period of between 5 and 145 milliseconds. If so, the system reports a hit on the call reference and returns, at block 131. If, at decision block 129, the count is equal to or greater than thirty, then the system tests at decision block 133 whether the value of the count is between 30 and 99, which indicates an on-hook condition for a period of 150 milliseconds to 495 milliseconds, which corresponds to a pulse dialed digit. If, at decision block 133, the count is between 30 and 99, then processing continues at FIG. 7, as indicted generally at block 135.

If, at decision block 133, the count is equal to or greater than 100, then the system tests at decision block 137 whether or not the count is between 100 and 309, which indicates an on-hook condition lasting from 500 milliseconds to 1.50 seconds. If so, the system reports a flash on the call reference, at block 139, and returns. If, at decision block 137, the count is 310 or more, the system reports an error at block 141 and returns.

Figure 6:
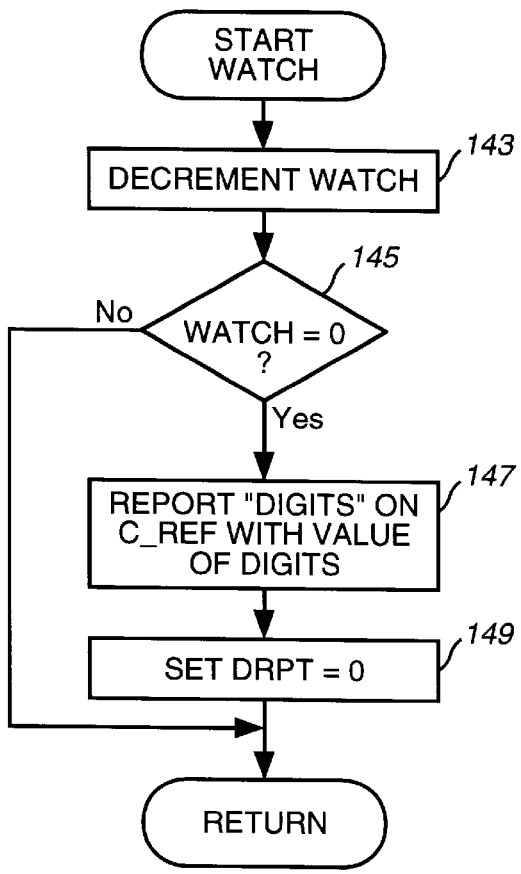
FIG. 6 is a flowchart of watch processing according to the present invention.
Figure 7:
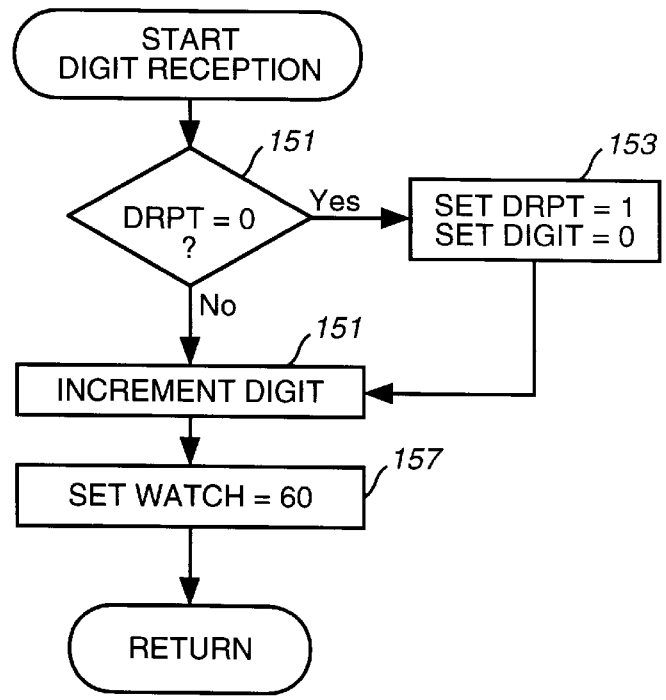
FIG. 7 is a flowchart of digit receipt processing according to the present invention.

Referring now to FIGS. 6 and 7, there is shown, respectively, watch processing and digit receipt processing. Watch processing is indicated generally at block 123 of FIG. 4 and it maintains the value in watch field 61 of FIG. 31 to measure interdigit timing for pulse dialing. Digit receipt processing is indicated generally at block 135 of FIG. 5 and it maintains the value stored in digit field 59 of FIG. 8. Watch processing of FIG. 6 and digit receipt processing of FIG. 7 work together to report pulse digit dialing.

Referring first to FIG. 6, the system decrements the value stored in watch field 61, at block 143. Then, the system tests, at decision block 145 whether or not the value in the watch counter is zero. If not, the system returns to decision block 107 of FIG. 4. If, at decision block 145, watch is equal to zero, then the system reports digits on the call reference with the value contained in digit field 59 of FIG. 8, at block 147. Then, the system sets the digit parameter equal to zero, at block 149 and returns.

It will be recalled, with reference to block 135 of FIG. 5, that digit receipt processing is entered whenever the line transitions from off-hook to on-hook and back in between 150 and 500 milliseconds. Referring to FIG. 7, the system tests, at decision block 151, whether or not the digit receipt parameter is equal to zero. If so, the system sets the digit receipt parameter to one and sets the digit counter (field 59 of FIG. 8) to zero, at block 153. If the digit receipt parameter is not set to zero, at decision block 151, the system increments the digit counter, at block 155. Then, the system sets the value in watch field 61 of FIG. 8 to 60, which corresponds to an interdigit timing interval of 300 milliseconds, at block 157, and returns.

In operation, the system monitors the command channel and buffers the supervision frames of each DS1 channel.

When the system decodes a setup confirm message, it extracts the call reference and the DS1 and DS0 channel assigned to the call, and notifies the A/B program of the detection of a call reference on a particular DS1 and DS0 channel. The system inserts appropriate values into the line 33 of table 31 corresponding to the DS0 channel by setting the activity parameter to one, which indicates that the channel is active, inserting the call reference into the table, and setting the $A/B_{old}$ and $A/B_{new}$ values to 11. The system sets the remaining fields to zero. Then, the system sends a setup confirm on the call reference for display.

A DS1 channel operates at 8000 frames per second, and every sixth frame is a supervision frame. Thus, the system buffers a supervision frame every 0.75 milliseconds. The system enters the A/B process every 0.75 milliseconds to process each DS0 entry in table 31 having an activity parameter set to on and an abandoned parameter set to off. The system enters the timer process every five milliseconds to increment the timer counter for each DS0 entry in table 31 having an activity parameter set to on and an abandoned parameter set to off, and to report abandoned on any DS0 that has gone on-hook for 1.55 seconds.

Each time the system enters the A/B process, the system replaces $A/B_{old}$ bits with the $A/B_{new}$ bits and transfers the A/B bits the buffer to the $A/B_{new}$ field for each active DS0. The system then compares the $A/B_{old}$ bits with the $A/B_{new}$ bits, and performs appropriate processing whenever they are different from each other. If the change in A/B bits indicates a transition from off-hook to on-hook, the system sets the timer parameter to on. If the change in A/B bits indicates a transition from on-hook to off-hook, the system sets the timer parameter to off and makes a report based on the value in the timer counter.

From the foregoing, it may be seen that the present invention provides a system and method that are useful in trouble shooting telephone systems. By displaying both the command channel signaling and the line status with each other on the same display screen, a technician can pin-point the source of problems.

What is claimed is:

1. A method of monitoring the conditions of channels in a multichannel telecommunications line, said channels including a command channel and a plurality of traffic channels, each of said traffic channels using A/B bit signaling, said method comprising the steps of:

monitoring said command channel;

detecting a setup acknowledgement message that includes a call reference and a channel identifier that identifies one of said plurality of traffic channels;

displaying said detected setup acknowledgment message;

displaying the line status of said traffic channel identified by said channel identifier;

monitoring said traffic channel identified by said channel identifier for a change in line status as indicated by the A/B bit signaling; and in response to detection of a change in line status of said traffic channel identified by said channel identifier, displaying the changed line status.

2. The method as claimed in claim 1, including the step of decoding A/B bits of said traffic channels.

3. The method as claimed in claim 1, including the steps of comparing A/B bits of each successive supervisory frame for said traffic channel identified by said channel identifier;

decoding said A/B bits whenever the A/B bits of successive supervisory frames are different.

4. The method as claimed in claim 1, including the steps of starting a timer whenever A/B bits signal of said traffic channels a transition from an off-hook condition to an on-hook condition.

5. The method as claimed in claim 4, including the step of displaying call abandoned message whenever said timer times out without the detection of a transition of said A/B bits from said on-hook condition to an off-hook condition.

6. The method as claimed in claim 4, including the steps of:

displaying a flash message in response to detection of a transition of said A/B bits from said on-hook condition to an off-hook condition within a selected first range of time values of said timer.

7. The method as claimed in claim 4, including the steps of:

displaying a hit message in response to detection of a transition of said A/B bits from said on-hook condition to an off-hook condition within a selected second range of time values of said timer.

8. The method as claimed in claim 4, including the steps of:

displaying a pulse dialed digits message in response to detection of a transition of said A/B bits from said on-hook condition to an off-hook condition within a selected second range of time values of said timer.

9. The method as claimed in claim 4, including the steps of:

displaying a ring on message in response to detection of a transition of said A/B bits from said on-hook condition to a ringing condition.

10. The method as claimed in claim 9, including the steps of:

displaying a ring off message in response to detection of a transition of said A/B bits from said ringing condition to said on-hook condition.

11. A method of monitoring the status of a plurality of traffic channels, each of said channels reporting status by A/B bit signaling in supervision frames, which comprises the steps of:

maintaining a table, said table including a line for each traffic channel, each line including an activity parameter, a call reference number, $A/B_{old}$ bit values, $A/B_{new}$ bit values, a timer parameter, a timer counter, an abandoned parameter, a digit receipt parameter, a digit counter, and a watch counter;

in response to detecting a setup confirm message identifying one of said plurality of traffic channels and including a call reference, in the line for the identified traffic channel,
    setting said activity parameter to active,
    inserting the call reference in the call reference number,
    setting each of said $A/B_{old}$ and $A/B_{new}$ bit values to b 11,
    setting the timer parameter to off,
    setting the abandoned parameter to off,
    setting the digit receipt parameter to off, setting the digit counter to zero, and
    setting the watch counter to zero.

12. The method as claimed in claim 11, including the steps of:

for each supervision frame and for each channel having an activity parameter set to on, replacing the $A/B_{old}$ bits with the $A/B_{new}$ bits and inserting the A/B bits of said channel into said $A/B_{new}$ value;

comparing said $A/B_{old}$ bits with said $A/B_{new}$ bits; and, reporting a change of status for said channel in response to said $A/B_{old}$ bits and said $A/B_{new}$ bits being different from each other.

13. The method as claimed in claimed in claim 12, including the steps of:
   setting said timer parameter to on whenever the comparison of said $A/B_{old}$ bits and said $A/B_{new}$ bits indicates a transition to on-hook.

14. The method as claimed in claim 13, including the step of:
   periodically incrementing said timer counter in each line having an activity parameter set to on, a timer parameter set to on, and an abandoned parameter set to off.

15. The method as claimed in claim 14, including the steps of:
   whenever the comparison of said $A/B_{old}$ bits and said $A/B_{new}$ bits indicates a transition to off-hook,
   setting said timer parameter to off, and
   checking the count in said timer counter.

16. The method as claimed in claim 15, including the step of:
   reporting off-hook whenever said count is zero.

17. The method as claimed in claim 15, including the step of:
   reporting hit whenever said count is in a first selected range of values.

18. The method as claimed in claim 15, including the step of:
   reporting flash whenever said count is in a second selected range of values.

19. The method as claimed in claim 15, including the step of:
   collecting pulse dialed digits whenever said count is in a third selected range of values.

20. The method as claimed in claim 19, wherein said step of collecting pulse dialed digits includes the steps of:
   setting said digit receipt parameter to on;
   incrementing said digit counter; and,
   setting said watch counter to a selected value.

21. The method as claimed in claim 20, including the step of periodically decrementing said watch counter.

22. The method as claimed in claim 21, including the steps of:
   reporting the count in said watch counter whenever said watch counter is decremented to zero; and,
   setting said digit receipt parameter to off.

23. The method as claimed in claim 14, including the steps of:
   reporting abandoned whenever said count is equal to a selected maximum value; and,
   setting said abandoned parameter to on.

24. The method as claimed in claim 11, including the step of:
   in response to detecting a clear confirm message identifying a channel, setting the activity parameter in the line for the identified channel to off.

25. A system for monitoring the status of traffic channels, each of said traffic channels reporting status by A/B bit signaling in supervision frames, which comprises:
   a table, said table including a line associated with each traffic channel, each line including an activity parameter, a call reference number, A/B bit values, A/B bit values, a timer parameter, a timer counter, an abandoned parameter, a digit receipt parameter, a digit counter, and a watch counter;
   means responsive to detecting a setup confirm message identifying one of said traffic channels, for:
      setting the activity parameter in the line associated with said identified traffic channel to active,
      setting each of the $A/B_{old}$ and $A/B_{new}$ bit values to 11, and
      setting each of the timer parameter, timer counter, abandoned parameter, digit receipt parameter, digit counter, and watch counter to zero; and,
   means for comparing said $A/B_{old}$ and $A/B_{new}$ bit values to determine the status of the traffic channels.

26. The system as claimed in claim 25, including:
   means for replacing the $A/B_{old}$ bits with the $A/B_{new}$ bits and inserting the A/B bits of said channel into said $A/B_{new}$ value, for each supervision frame and for each channel having an activity parameter set to on;
   means for comparing said $A/B_{old}$ bits with said $A/B_{new}$ bits; and,
   means for reporting a change of status for said channel in response to said $A/B_{old}$ bits and said $A/B_{new}$ bits being different from each other.

27. The system as claimed in claimed in claim 26, including:
   means for setting said timer parameter to on whenever the comparison of said $A/B_{old}$ bits and said $A/B_{new}$ bits indicates a transition to on-hook.

28. The system as claimed in claim 27, including:
   means for periodically incrementing said timer counter in each line having an activity parameter set to on, a timer parameter set to on, and an abandoned parameter set to off.

29. The system as claimed in claim 28, including:
   means, responsive to the comparison of said $A/B_{old}$ bits and said $A/B_{new}$ bits indicating a transition to off-hook, for setting said timer parameter to off, and checking the count in said timer counter.

30. The system as claimed in claim 29, including:
   means for reporting off-hook whenever said count is zero.

31. The system as claimed in claim 28, including:
   means for reporting abandoned whenever said count is equal to a selected maximum value and setting said abandoned parameter to on.

32. The system as claimed in claim 25, including:
   means, responsive to detecting a clear confirm message identifying a channel, for setting the activity parameter in the line for the identified channel to off.

* * * * *